(12) United States Patent
Huang et al.

(10) Patent No.: US 11,131,601 B2
(45) Date of Patent: Sep. 28, 2021

(54) METHOD FOR IN-LINE OPTICAL TESTING

(71) Applicant: Rain Tree Photonics Pte. Ltd., Singapore (SG)

(72) Inventors: Ying Huang, Singapore (SG); Tsung-Yang Liow, Singapore (SG)

(73) Assignee: Rain Tree Photonics Pte. Ltd., Singapore (SG)

( * ) Notice: Subject to any disclaimer, the term of this patent is extended or adjusted under 35 U.S.C. 154(b) by 17 days.

(21) Appl. No.: 16/206,249

(22) Filed: Nov. 30, 2018

(65) Prior Publication Data

US 2019/0162628 A1    May 30, 2019

Related U.S. Application Data

(60) Provisional application No. 62/592,423, filed on Nov. 30, 2017.

(51) Int. Cl.
  *G01M 11/00*  (2006.01)
  *G02B 6/12*   (2006.01)
  *G01N 21/84*  (2006.01)

(52) U.S. Cl.
  CPC .............. *G01M 11/30* (2013.01); *G01N 21/84* (2013.01); *G02B 6/12* (2013.01); *G02B 6/12004* (2013.01); *G02B 6/12002* (2013.01); *G02B 2006/12038* (2013.01); *G02B 2006/12061* (2013.01)

(58) Field of Classification Search
  CPC ..... G01M 11/30; G02B 6/12004; G02B 6/12; G02B 6/12002; G02B 2006/12038; G02B 2006/12061; G02B 6/136; G02B 6/124; G02B 6/1228; G02B 6/122; G02B 6/13; G02B 6/34; G02B 2006/12147; G02B 6/12007; G02B 6/42; G02B 2006/12142; G02B 2006/12097; G02B 2006/12104; G02B 2006/12107; G02B 6/30; G02B 2006/12176; G02B 2006/12164; G01N 21/84; H01L 31/02327; H01L 2223/6627; H01S 5/021; H01S 5/026; H01S 5/02248; H01S 5/12; H01S 5/141; H01S 3/063; H01S 5/1014; G02F 1/025; G02F 1/011; G02F 1/2257; H04B 10/801; H04B 10/2504; H04B 10/50; H04B 10/70; Y02P 70/521
  See application file for complete search history.

(56) References Cited

U.S. PATENT DOCUMENTS 3,542,536 A * 11/1970 Sahineller ................ G02B 6/13
                                                         65/111
4,750,799 A *  6/1988 Kawachi ............ G02B 6/12004
                                                         385/14
5,131,060 A *  7/1992 Sakata .................. G02F 1/3133
                                                         257/184

(Continued)

OTHER PUBLICATIONS

Topley, et al.; Locally Erasable Couplers for Optical Device Testing in Silicon on Insulator; Journal of Lightwave Technology; vol. 32, No. 12, Jun. 15, 2014; pp. 2248-2253.

*Primary Examiner* — Mohamed K Amara
(74) *Attorney, Agent, or Firm* — Dinsmore & Shohl LLP

(57) ABSTRACT

A method for in-line optical testing is provided. The method includes providing a substrate, forming an optical device on the substrate, and forming a test circuit on the substrate, the test circuit being optically coupled to the optical device. An optical test is performed on the optical device with the test circuit. The test circuit is then removed.

7 Claims, 7 Drawing Sheets

(56) References Cited

U.S. PATENT DOCUMENTS

| | | | | |
|---|---|---|---|---|
| 5,138,676 A * | 8/1992 | Stowe | G02B 6/3829 | 385/32 |
| 5,444,730 A * | 8/1995 | Mizutani | H01S 5/1032 | 372/19 |
| 5,825,047 A * | 10/1998 | Ajisawa | H01L 31/022408 | 257/12 |
| 5,963,358 A * | 10/1999 | Shields | B82Y 20/00 | 257/E31.032 |
| 6,072,925 A * | 6/2000 | Sakata | G02B 6/124 | 372/50.1 |
| 6,115,518 A * | 9/2000 | Clapp | G02B 6/124 | 385/37 |
| 6,363,097 B1 * | 3/2002 | Linke | H01S 5/141 | 359/3 |
| 6,385,376 B1 * | 5/2002 | Bowers | G02B 6/12 | 385/130 |
| 6,516,117 B1 * | 2/2003 | Fujimaki | G02B 6/02142 | 385/123 |
| 6,542,685 B1 * | 4/2003 | Yoneda | C03C 17/02 | 385/129 |
| 6,567,573 B1 * | 5/2003 | Domash | G02B 6/12007 | 385/10 |
| 6,580,862 B2 * | 6/2003 | Kominato | G02B 6/105 | 385/129 |
| 6,681,067 B1 * | 1/2004 | Kersey | G02B 6/02085 | 359/566 |
| 6,771,857 B1 * | 8/2004 | Domash | G02B 6/12007 | 349/201 |
| 6,816,648 B2 * | 11/2004 | Goldstein | G02B 6/124 | 359/566 |
| 9,765,178 B2 * | 9/2017 | Duerksen | B29D 11/00663 | |
| 9,817,297 B1 * | 11/2017 | Melikyan | G02B 6/13 | |
| 10,141,709 B2 * | 11/2018 | Ishaaya | H01S 3/11 | |
| 2002/0176463 A1 * | 11/2002 | Bullington | H01S 5/187 | 372/45.01 |
| 2003/0013304 A1 * | 1/2003 | Deliwala | G02F 1/295 | 438/689 |
| 2003/0022456 A1 * | 1/2003 | Callaway, Jr. | G02B 6/12004 | 438/385 |
| 2003/0034538 A1 * | 2/2003 | Brophy | G02B 6/136 | 257/444 |
| 2003/0068130 A1 * | 4/2003 | Gao | G02B 6/1221 | 385/37 |
| 2003/0118271 A1 * | 6/2003 | Fujimaki | G02B 6/125 | 385/15 |
| 2005/0047705 A1 * | 3/2005 | Domash | G02F 1/011 | 385/10 |
| 2005/0128592 A1 * | 6/2005 | Nishii | G02B 6/29311 | 359/573 |
| 2005/0201683 A1 * | 9/2005 | Ghiron | G02B 6/1228 | 385/39 |
| 2005/0254752 A1 * | 11/2005 | Domash | G02F 1/313 | 385/37 |
| 2006/0029348 A1 * | 2/2006 | Kempen | G02B 6/1228 | 385/129 |
| 2006/0078254 A1 * | 4/2006 | Djordjev | G02B 6/12007 | 385/32 |
| 2006/0126992 A1 * | 6/2006 | Hashimoto | G02B 6/12009 | 385/14 |
| 2009/0065682 A1 * | 3/2009 | Webster | G02B 6/1228 | 250/208.2 |
| 2009/0123114 A1 * | 5/2009 | Webster | G02B 6/30 | 385/17 |
| 2009/0181635 A1 * | 7/2009 | Yamada | H01P 3/084 | 455/333 |
| 2009/0274328 A1 * | 11/2009 | Gebhardt | H04R 25/554 | 381/331 |
| 2009/0297093 A1 * | 12/2009 | Webster | G02B 6/1228 | 385/14 |
| 2010/0065862 A1 * | 3/2010 | Ray | H01L 31/028 | 257/88 |
| 2010/0099100 A1 * | 4/2010 | Zaccarin | G01N 21/6452 | 435/6.11 |
| 2010/0304521 A1 * | 12/2010 | Seutter | H01L 31/03529 | 438/71 |
| 2011/0235962 A1 * | 9/2011 | Shubin | G02F 1/025 | 385/14 |
| 2011/0274393 A1 | 11/2011 | Reed et al. | | |
| 2014/0092385 A1 * | 4/2014 | Nitkowski | G01J 3/18 | 356/326 |
| 2015/0293303 A1 * | 10/2015 | Pan | G02B 6/136 | 385/14 |
| 2015/0355377 A1 * | 12/2015 | Miller | G02B 6/124 | 428/201 |
| 2017/0123160 A1 * | 5/2017 | Kato | G02B 6/26 | |
| 2018/0164505 A1 * | 6/2018 | Lin | G02B 6/126 | |
| 2019/0204504 A1 * | 7/2019 | Chiles | G02B 6/02109 | |
| 2019/0253775 A1 * | 8/2019 | Seok | H04J 14/02 | |
| 2020/0049884 A1 * | 2/2020 | Nader | G02B 6/1228 | |

* cited by examiner

METHOD FOR IN-LINE OPTICAL TESTING

FIELD OF THE INVENTION

The present invention relates to the field of photonics and more particularly to a method for in-line optical testing.

BACKGROUND OF THE INVENTION

In integrated photonics fabrication, optical waveguide layers are typically formed in initial stages of fabrication and are subsequently covered with dielectric cladding and metal layers. Efficient testing of buried optical circuits at wafer level is key to enabling volume production and actual deployment. It is therefore desirable to provide a method for in-line optical testing.

SUMMARY OF THE INVENTION

Accordingly, in a first aspect, the present invention provides a method for in-line optical testing including providing a substrate, forming an optical device on the substrate, and forming a test circuit on the substrate, the test circuit being optically coupled to the optical device. An optical test is performed on the optical device with the test circuit. The test circuit is then removed.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

A method for in-line optical testing will now be described below with reference to FIGS. 1A through 1C.

Figure 1A:
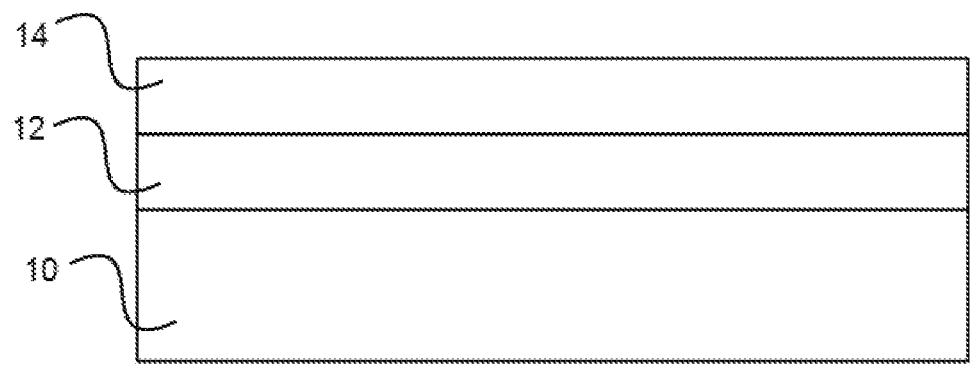
FIGS. 1A through 1C are schematic cross-sectional views illustrating a method for in-line optical testing in accordance with an embodiment of the present invention.

Referring now to FIG. 1A, a substrate 10 is provided as shown. The substrate 10 may be a commercially available silicon-on insulator (SOI) wafer. In the embodiment shown, the substrate 10 may be formed of silicon (Si) and may be provided with a bottom oxide layer (BOX) 12 and a crystal-silicon (crystal-Si) device layer 14.

Figure 1B:
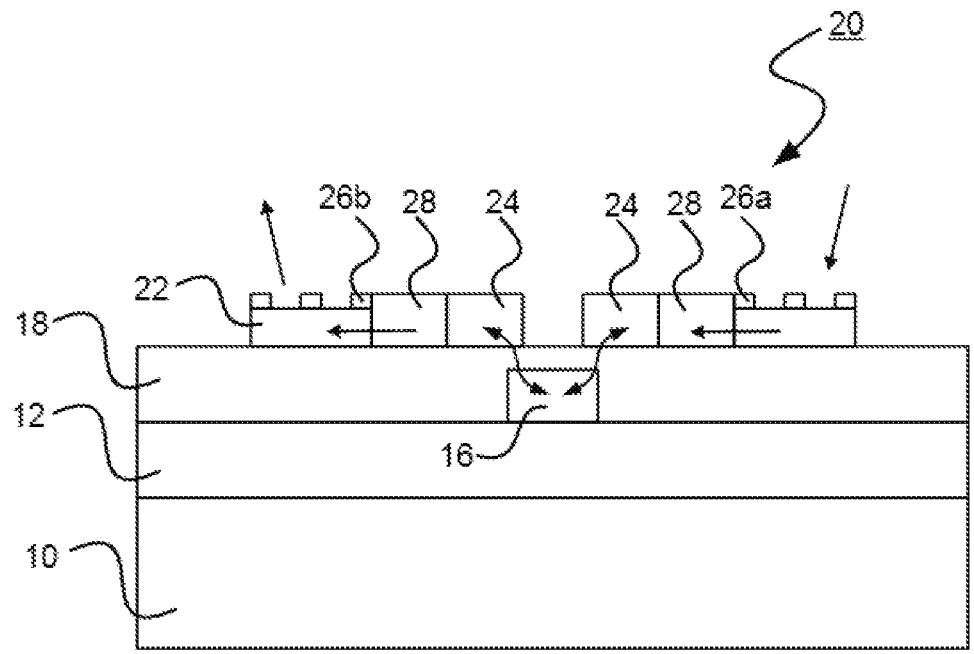

Referring now to FIG. 1B, an optical device or device under test (DUT) 16 is formed on the substrate 10 and this is followed, in the present embodiment, by deposition of a cladding layer 18. A test circuit 20 is formed on the substrate 10, the test circuit 20 being optically coupled to the optical device 16.

In the present embodiment, the optical device or DUT 16 is formed in the crystal-Si device layer 14 shown in FIG. 1A.

The cladding layer 18 may be formed of silicon dioxide ($SiO_2$).

In the embodiment shown, the test circuit 20 is at least partially formed on a waveguide layer 22. The waveguide layer 22 may be formed of silicon (Si) and/or silicon nitride ($Si_3N_4$). In the present embodiment, the test circuit 20 is fabricated on a different waveguide layer above a waveguide layer of the DUT 16. In one or more alternative embodiments, the test circuit 20 may be fabricated on a different waveguide layer below a waveguide layer of the DUT 16 or on the same waveguide layer as the DUT 16.

Figure 2:
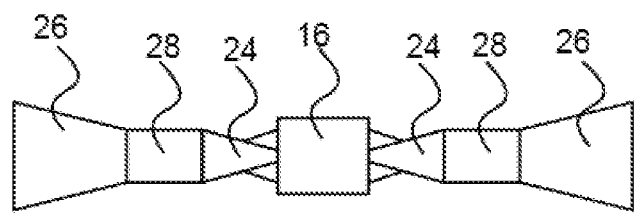
FIG. 2 is a schematic top plan view of an optical device and a test circuit of FIG. 1B.

Referring now to FIG. 2, a schematic top plan view of the optical device 16 and the test circuit 20 of FIG. 1B is shown. In the embodiment shown, the test circuit 20 includes an inter-layer optical coupler 24 optically coupled to the optical device 16, a grating coupler 26 and a bus waveguide 28 coupling the inter-layer optical coupler 24 to the grating coupler 26. In the present embodiment, the inter-layer optical coupler 24, the connecting bus waveguide 28 and the grating coupler 26 are provided as a pair. In the embodiment shown, the grating coupler 26 is configured to couple light in and out of the optical device 16 for wafer level testing and is provided on the waveguide layer 22 shown in FIG. 1B. In this manner, optical access to the DUT 16 is achieved with a dedicated test circuit.

The test circuit 20 may be formed via one or more of film deposition, photo-lithography patterning and etching.

Referring again to FIG. 1B, an optical test is performed on the optical device 18 with the test circuit 22. More particularly, light entering from a first grating coupler 26a is coupled into the DUT 16 through the inter-layer optical coupler 24 and then proceeds to leave through a reverse path from a second grating coupler 26b.

Figure 1C:
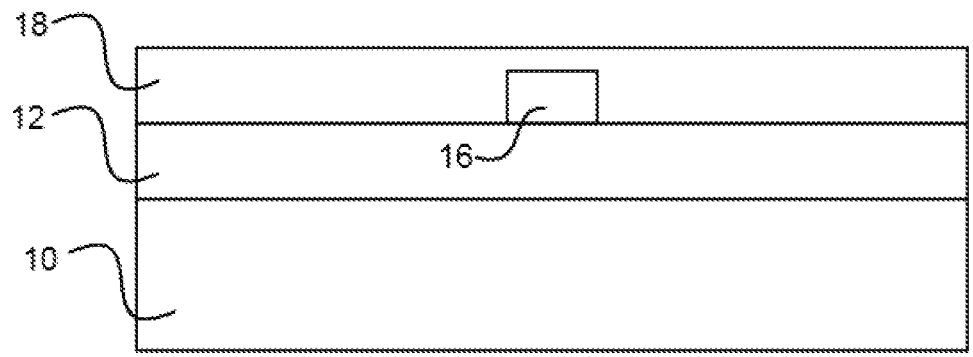

Referring now to FIG. 1C, the test circuit 22 is removed after in-line optical testing. This may be by performing an etching process to remove the test circuit 20 shown in FIG. 1B. In the present embodiment, a blanket etching process may be performed. More particularly, the test circuit 22 may be removed by blanket etching of the waveguide layer 22 shown in FIG. 1B. Advantageously, by removing the grating coupler 26 that is connected to the DUT 16, optical input/output (I/O) options of the optical device 16 are opened up, allowing optical access to individual components of the optical device 16.

Although not shown in the present embodiment, additional device layers may be built thereon after removal of the test circuit 22.

In the manner described above, reconfigurable in-line testing with a test circuit formed on a different waveguide layer than the DUT 16 is thus achieved.

Another method for in-line optical testing will now be described below with reference to FIGS. 3A through 3C.

Figure 3A:
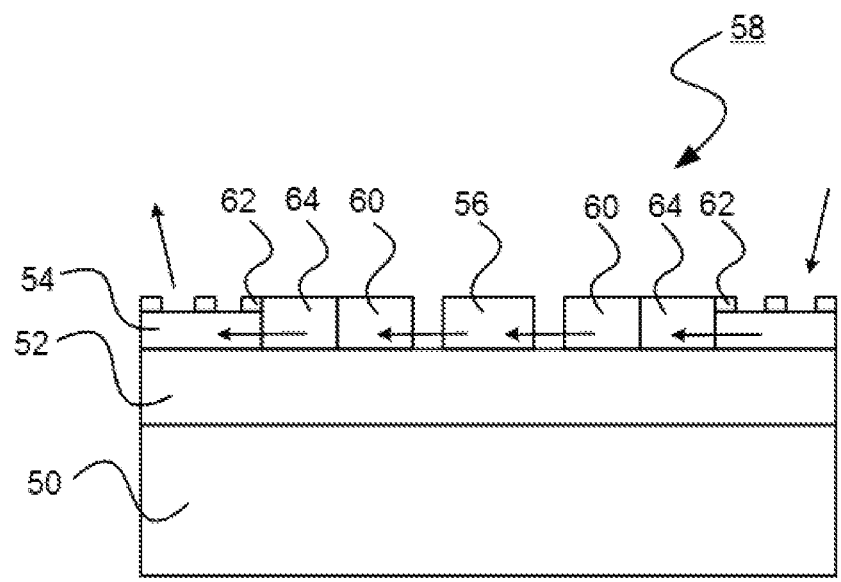
FIGS. 3A through 3C are schematic cross-sectional views illustrating a method for in-line optical testing in accordance with another embodiment of the present invention.

Referring now to FIG. 3A, a substrate 50 is provided as shown. In the embodiment shown, the substrate 50 is provided with a bottom oxide layer (BOX) 52 and a crystal-silicon (crystal-Si) device layer 54. An optical device or device under test (DUT) 56 and a test circuit 58 are formed on the substrate 50, the test circuit 58 being optically coupled to the optical device 56.

In the embodiment shown, the test circuit 58 is formed on the same waveguide or optical layer 54 as the DUT 56 in a designated area of the substrate 50. In the present embodiment, the optical device 56 and the test circuit 58 may be simultaneously formed. Advantageously, this minimises or reduces the need for extra processing steps. The DUT 56 and the test circuit 58 may be simultaneously formed in and/or on the crystal-Si device layer 54 of the substrate 50 by a two-step silicon (Si) etch process.

Different test circuits may be employed depending on the design of the optical device or DUT 56. The different test circuits may employ, for example, an edge coupler, such as a nano-taper coupler or a suspended coupler, or a directional coupler (DC), depending on the design of the DUT 56.

Figure 4:
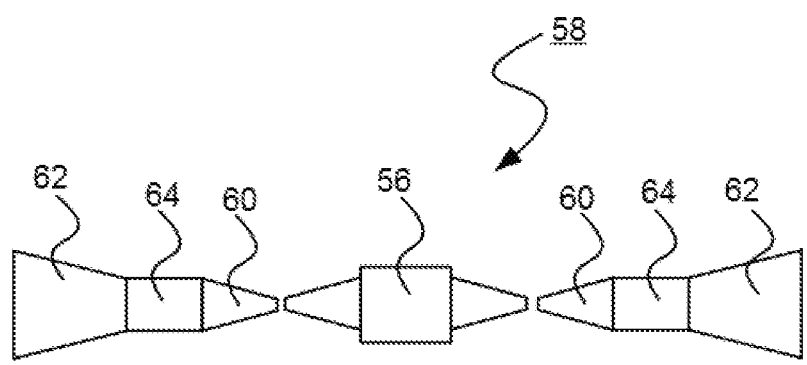
FIG. 4 is a schematic top plan view of an optical device and a test circuit of FIG. 3A.

Referring now to FIG. 4, a schematic top plan view of the optical device 56 and the test circuit 58 of FIG. 3A is shown. In the embodiment shown, the test circuit 58 includes an edge coupler 60 optically coupled to the optical device 56, a grating coupler 62 and a bus waveguide 64 coupling the edge coupler 60 to the grating coupler 62. In the present embodiment, the edge coupler 60 is a nano-taper coupler and the nano-taper coupler 60, the connecting bus waveguide 64 and the grating coupler 62 are provided as a pair. In the embodiment shown, the grating coupler 62 is configured to couple light in and out of the optical device 56 for wafer level testing and is provided on the waveguide layer 54 shown in FIG. 3A. In this manner, optical access to the DUT 56 is achieved with a dedicated test circuit.

Referring again to FIG. 3A, an optical test is performed on the optical device 56 with the test circuit 58. During the optical test, light is coupled into the optical device or DUT 56 through the nano-taper coupler 60.

Figure 3B:
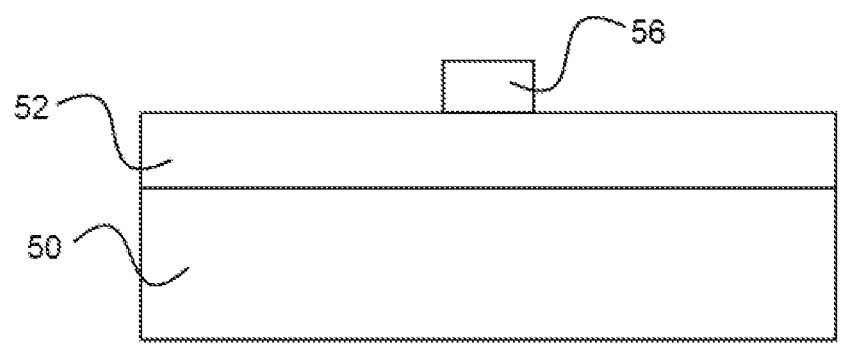

Referring now to FIG. 3B, the test circuit 58 is removed after in-line optical testing is completed. This may be by performing an etching process to remove the test circuit 58 shown in FIG. 3A. In the present embodiment, a selective etching process may be performed. More particularly, a selective silicon (Si) etch step may be performed to remove the test circuit 58.

Figure 3C:
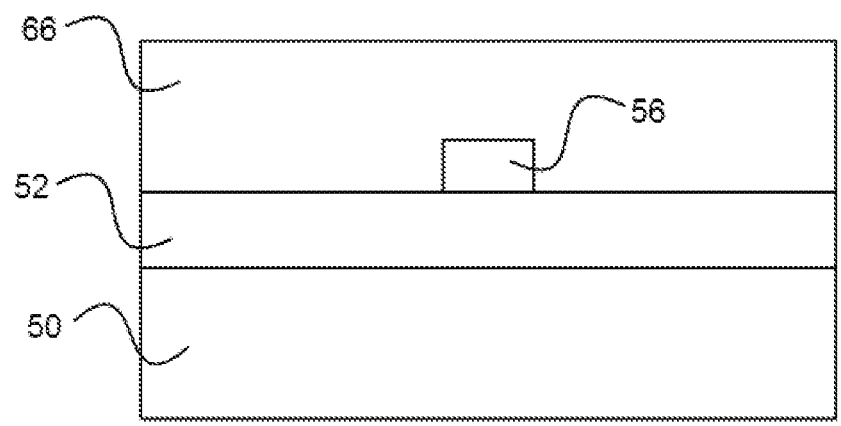

Referring now to FIG. 3C, a cladding layer 66 may then be deposited over the optical device 56. The cladding layer 66 may be formed of silicon dioxide ($SiO_2$).

Although not shown in the present embodiment, additional device layers may be built thereon after deposition of the cladding layer 66.

In the manner described above, reconfigurable in-line testing with a test circuit formed on the same optical layer as the DUT 56 is thus achieved.

Figure 5:
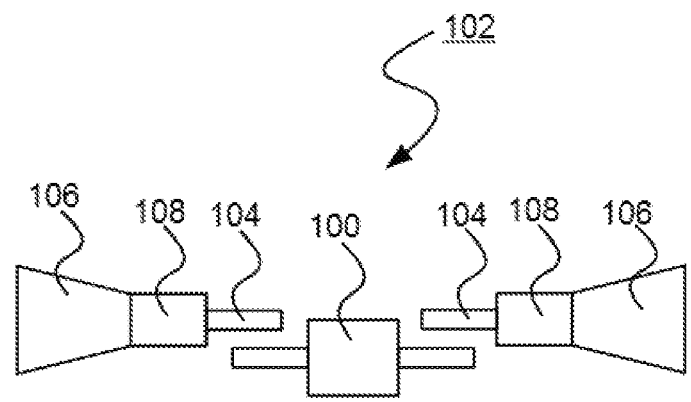
FIG. 5 is a schematic top plan view of an optical device and a test circuit in accordance with another embodiment of the present invention.

Referring now to FIG. 5, a schematic top plan view of an optical device or DUT 100 and a test circuit 102 in accordance with another embodiment of the present invention is shown. In the embodiment shown, the test circuit 102 includes a directional coupler 104 optically coupled to the optical device 100, a grating coupler 106 and a bus waveguide 108 coupling the directional coupler 104 to the grating coupler 106. In the present embodiment, the directional coupler 104, the connecting bus waveguide 108 and the grating coupler 106 are provided as a pair. During optical testing, light is coupled into the optical device or DUT 100 through the directional coupler 104. The test circuit 102 of the present embodiment may be employed when the optical device or DUT 100 is an isolated device or is provided with grating coupler input/output (I/O).

Yet another method for in-line optical testing will now be described below with reference to FIGS. 6A and 6B.

Figure 6A:
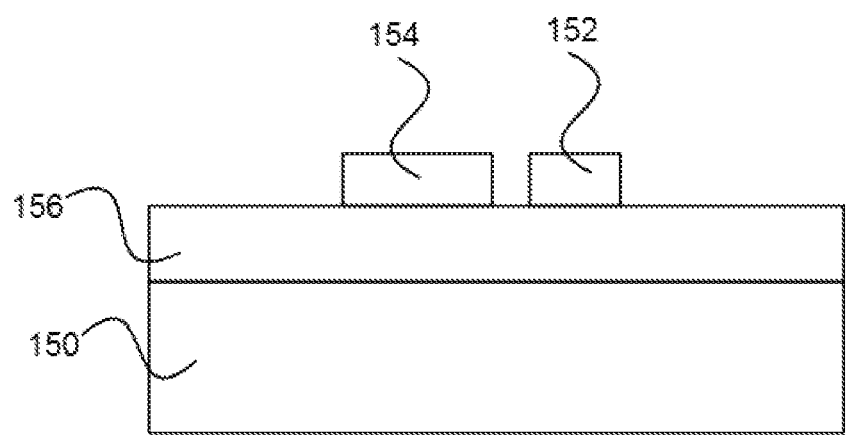
FIGS. 6A and 6B are schematic cross-sectional views illustrating a method for in-line optical testing in accordance with yet another embodiment of the present invention.

Referring now to FIG. 6A, a substrate 150 is provided and an optical device or device under test (DUT) 152 and a test circuit 154 are formed on the substrate 150, the test circuit 154 being optically coupled to the optical device 152. In the embodiment shown, the substrate 150 is provided with a bottom oxide layer (BOX) 156.

Figure 7:
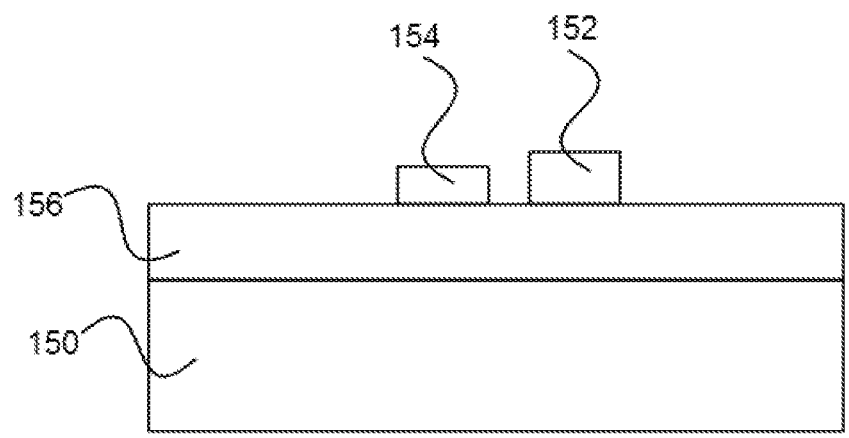
FIGS. 7 and 8 are schematic cross-sectional views of an optical device and a test circuit in accordance with alternative embodiments of the present invention.
Figure 8:
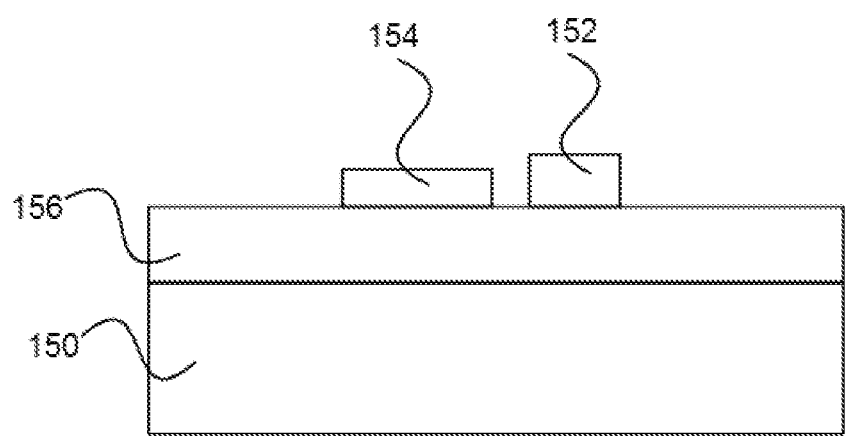

The test circuit 154 in the present embodiment is designed to be reconfigurable by a subsequent fabrication process step. In the present embodiment, the test circuit 154 includes a directional coupler with a different coupling coefficient under different clad conditions that is optically coupled to the optical device. Such a coupler may have a maximum optical coupling coefficient to the DUT in air cladding for in-line testing. The directional coupler may be connected to a grating coupler via a bus waveguide and may be an asymmetrical direction coupler. The asymmetrical direction coupler may have a different width to the DUT as shown in FIG. 6A, a different height to the DUT as shown in FIG. 7 or both as shown in FIG. 8.

Figure 6B:
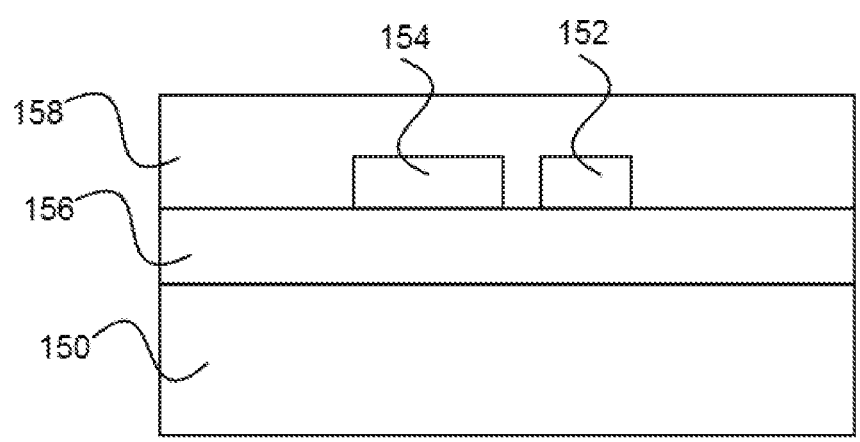

Referring now to FIG. 6B, the test circuit 154 is removed by reconfiguring the test circuit 154. In the present embodiment, a cladding layer 158 is deposited over the test circuit 154 to reconfigure the test circuit 154 as after cladding deposition, the coupling coefficient of the directional coupler drops to a minimum, disabling optical access to the DUT 152. Removal of the test circuit 154 is thus achieved by configuring the test circuit 154 to cut off optical access to the optical device 152 after performing in-line optical testing.

In the manner described above, reconfigurable in-line testing with a reconfigurable test circuit 154 is thus achieved.

As is evident from the foregoing discussion, the present invention provides a method for reconfigurable in-line optical testing of photonic integrated circuits and devices on a semiconductor wafer, after which the in-line optical testing circuits may be removed or reconfigured. Advantageously, in-line optical testing of photonic integrated circuits and devices on a semiconductor wafer provides for economics of scale in volume scale-ups. Further advantageously, this also allows optical devices to be tested as soon as possible after formation during the fabrication process and this facilitates early failure detection for repair or scratch.

While preferred embodiments of the invention have been illustrated and described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method for in-line optical testing, comprising:
providing a substrate;
forming an optical device on the substrate;
forming a test circuit on the substrate, wherein the test circuit is optically coupled to the optical device and wherein the test circuit comprises one or more couplers;
performing an optical test on the optical device with the test circuit; and
removing the test circuit after performing the optical test, wherein removing the test circuit comprises
reconfiguring the test circuit by a subsequent fabrication process step, wherein
reconfiguring the test circuit comprises depositing a cladding layer over the test circuit to reconfigure the test circuit and wherein at least one of the one or more couplers has a different coupling coefficient under different clad conditions.

2. The method of claim 1, wherein the optical device and the test circuit are simultaneously formed.

3. The method of claim 1, wherein the one or more couplers are selected from the group consisting of an inter-layer optical coupler, an edge coupler, a grating coupler, and a directional coupler.

4. The method of claim 3, wherein the edge coupler comprises one of a nano-taper coupler and a suspended coupler.

5. The method of claim 3, wherein the directional coupler comprises an asymmetrical direction coupler.

6. The method of claim 5, wherein the asymmetrical directional coupler has at least one of a different height and a different width than the optical device.

7. The method of claim 1, wherein the test circuit further comprises a bus waveguide coupled to at least one of the one or more couplers.

* * * * *